H. M. ANGLE & F. J. ROOT.
PROCESS OF WOOD DISTILLATION.
APPLICATION FILED AUG. 7, 1911.
1,174,537.
Patented Mar. 7, 1916.
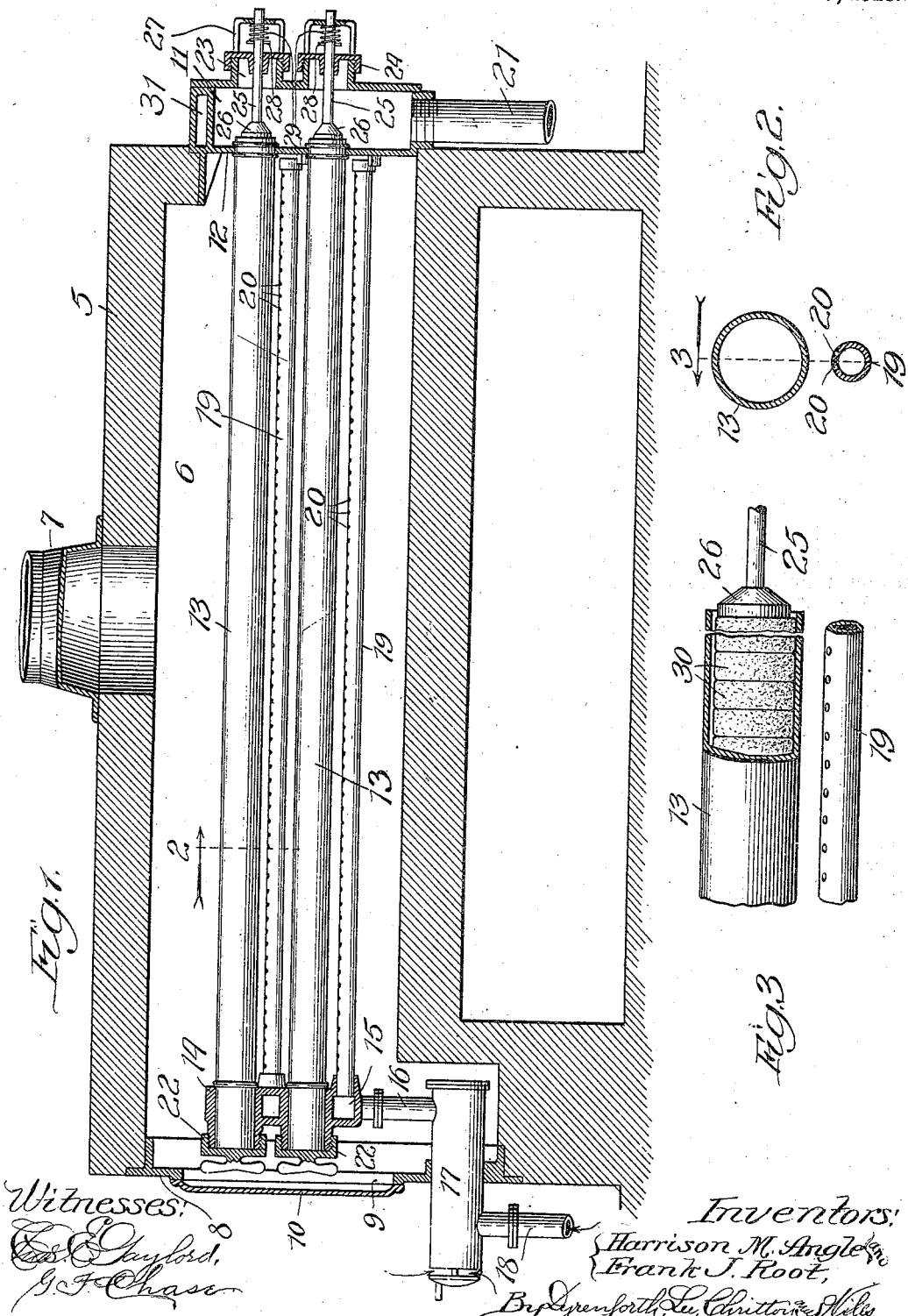

UNITED STATES PATENT OFFICE.

HARRISON M. ANGLE AND FRANK J. ROOT, OF CHICAGO, ILLINOIS, ASSIGNORS TO WOOD REDUCTION COMPANY, OF NEW YORK, N. Y., A CORPORATION OF NEW YORK.

PROCESS OF WOOD DISTILLATION.

1,174,537.  Specification of Letters Patent.  Patented Mar. 7, 1916.

Application filed August 7, 1911. Serial No. 642,801.

*To all whom it may concern:*

Be it known that we, HARRISON M. ANGLE and FRANK J. ROOT, citizens of the United States, residing at Chicago, in the county of Cook and State of Illinois, have invented a new and useful Improvement in the Process of Wood Distillation, of which the following is a specification.

This invention relates to improvement in the method of treating wood to obtain constituent parts as commercial products.

Our object is to provide a novel mode of procedure whereby wood may be treated with economy in large quantities for the recovery of such desired volatile and resinous constituents as it may contain, as well as carbonized residue, in a manner which renders such products of superior quality and therefore of the greatest commercial value.

In the treatment of either soft or hard wood, when its valuable volatile and liquefiable constituents are to be recovered, and the residual product is charcoal, destructive distillation is a necessary step of the process.

For the purpose of extracting and collecting turpentine in an uninjured condition from pine-wood its treatment in a digester by what is known as the "steam process" has been extensively employed. In this process, according to the most approved practice, the resinous wood is first comminuted and then subjected in the digester to the action of steam maintained at a temperature below that which will cause destructive distillation, in the sense of chemical disintegration, of the constituents of the wood. The steam current sweeps the turpentine out of the mass into condensers, where it is liquefied into crude wood turpentine, a product which is easily and cheaply refined into a commercial article and has approximately the same market value as that produced by "boxing" pine trees. The comminuted residue left in the digester after the turpentine has been extracted is known as "spent wood" and contains a large percentage of resinous matter. At the plants where turpentine is extracted by the steam process, part of the spent wood is usually burned as fuel, and the rest discarded. Commonly where the steam process is employed a good quality of turpentine is produced at the sacrifice of most, if not all, of the other valuable constituents of the wood; and where destructive distillation is practised on resinous wood the turpentine value is largely sacrificed to permit other constituents of the wood which are saved to be of the desired quality.

The novel mode of procedure constituting our present invention is applicable to the treatment of either hard or soft wood in comminuted condition, and our aim is to reclaim all the commercially valuable constituents of the wood cheaply, rapidly and in the conditions which give them the highest market value. Certain hard woods may be treated by destructive distillation alone to obtain therefrom the commercially valuable constituents, while the treatment of other woods requires, for the best results as a whole, that they be subjected to a preliminary step, such as steaming or otherwise, to extract constituents which the step of destructive distillation would tend to injure or destroy. In dealing, for example, with resinous wood by our process, the wood is first "hogged" and shredded, so that all will pass, by preference, through a screen of 10 mesh or finer, and then treated in a digester by the steaming process to carry off the turpentine. In the steaming process some pine oil and heavier liquefied constituents will escape with the turpentine, but may be refined out. From this point the treatment of the comminuted wood, whether of the hard or soft, and "spent", variety is, broadly considered, the same, though the difference in nature of the comminuted material and the variety of resultant products necessitates changes in manipulation of the apparatus employed for the step of destructive distillation.

Experience has proved to us that to obtain the best results in the practice of destructive distillation of wood, both from the standpoint of economy of operation and quality of resultant products, the wood should be dry and subjected to the distilling operation in blocks of great density and uniform size; that the heat applied to carbonize the blocks should be under substantially perfect control, and, furthermore, that the heat should be so applied to the blocks as to heat them substantially equally throughout. In this way the different volatilizable and liquefiable products may be, to a large extent at least, discharged and collected in the order of their formation, with minimum contamination of one by another.

As we practise the process, the comminuted mass of wood to be treated by destructive distillation is first dried and then pressed into blocks of great density. For this purpose we have employed a briqueting apparatus of the general type shown in United States Letters Patent No. 980,374, granted to White and Duryea January 3, 1911. The blocks or briquets which we have found it desirable for various reasons to employ are made under a pressure exceeding three tons and preferably of approximately ten tons to the square inch, and in the form of short cylinders not exceeding 8 inches and preferably only from 3 to 4 inches in diameter, and not exceeding 6 inches and preferably only from one to two inches in thickness. It may be stated, incidentally, that the briqueting cost is but small compared with the increased benefits which briqueting contributes to the process as a whole.

For purposes of illustration only and to render more clear the step of destructive distillation as we now prefer to practise it, we show, in the accompanying drawing, apparatus which thus far has given us the best results.

Referring to the drawing—Figure 1 is a broken longitudinal section of a retort; Fig. 2, an enlarged section taken on line 2 in Fig. 1; and Fig. 3, a broken and partly sectional view, the section being taken on line 3 in Fig. 2.

The numeral 5 designates the retort outer-wall or casing, which incloses an elongated heating-chamber 6, having a central outlet or stack 7. The forward end of the chamber is closed by a head 8 having a large opening 9 fitted with a door 10. At the rear end of the casing is a collecting-chamber 11 separated from the heating-chamber 6 by a tube-sheet 12. Fastened to the tube-sheet and extending through the chamber 6 is a plurality of retort-tubes which, in practice, are from ½ to 1 inch larger than the briquets to be treated. The tubes are preferably of steel and as thin as the requirements of strength and durability permit. Near their forward ends the tubes are rolled into a tube-sheet or chambered casting 14, the chamber 15 of which communicates, through a pipe 16, gas and air mixing chamber 17 and pipe 18, with a gas-supplier (not shown). Centrally beneath each retort-tube 13 is a gas-supply pipe 19, having two parallel series of perforations or burner-openings 20 disposed as shown. The pipes 19 communicate with the chamber 15, but are closed at their opposite ends adjacent to the tube-sheet 12. The tubes 13 open into the collecting-chamber 11, and extending from the latter is a discharge-pipe 21. The forward ends of the tubes 13 are closed by removable and replaceable screw-caps 22, and in the outer-wall of the chamber 11 are openings 23 somewhat larger than and registering with the tubes 13. The openings 23 are closed by removable screw-caps 24 provided in the illustration with central guide-openings, or stuffing-boxes, for plunger-rods 25 having expanded inner ends or heads 26 adapted to enter the ends of tubes 13, as illustrated in Fig. 3. On the caps 24 are yokes 27 through which the plunger-rods 25 pass, and confined between the ends of the yokes and pins, or shoulders, 28 on the rods are springs 29 which tend to thrust the heads 26 into the tubes 13.

In operation, the blocks or briquets 30 are charged into the tubes 13. To permit this the door 10 is opened and the caps 22 are removed. The briquets are slightly less in diameter than the interior of the tubes 13 and are readily inserted and advanced along until they substantially fill the length of the tubes. The caps 22 are replaced, the door 10 is then tightly closed and the gas is turned into the tube-sheet, or manifold, 14 to supply the pipes 19, and ignited at the openings 20. The hot products of combustion play against the retort-tubes 13 and surround the latter to heat them substantially equally throughout. Owing to the density of the briquets they therefore have high heat-conductivity and, being at their circumferential faces in close proximity to the inner walls of the tubes, are heated very rapidly and approximately equally throughout. As the volatile constituents of the blocks are freed therefrom they expand into the collecting-chamber, and are withdrawn through the pipe 21. In practice, the pipe 21 would lead to a condenser and discharge to a gas-holder and collecting receptacles for the liquid products.

During the first stage of the operation the more highly volatile constituents of the wood are discharged and collected, and as the heat progresses the heavier vapors pass off followed by the heavier liquiform products. Owing to the high conductivity of the compressed blocks or briquets 30 the heat, as before stated, penetrates them with great freedom and the external heat may be applied as rapidly as desired until the beginning of the period of exothermic heat. As each and every one of the blocks reaches this period at the same time, the external heat may then be reduced, thus obtaining the full benefit of the exothermic action. As the vapors and liquids flow into the collecting-chamber 11 as fast as they are formed none of them are subjected, to any material extent at least, to such overheating as would have an injurious effect thereon. As the operation progresses the fibrous constituent of the wood is gradually carbonized. During the operation the blocks or briquets first expand, and later while the heavier vapors are discharging and the liquids are running out they contract quite materially. If it is desired to maintain the blocks in close contact with each other the plunger-heads 26 pressed inwardly by springs or the like may be used to maintain the columns under longitudinal compression during expansion and contraction and for this purpose, springs 29 and plunger-rods 25, in practice, should be of sufficient length to properly perform the compressing action. When the operation is completed the gas-supply to the burner-tubes 19 may be cut off, the door 10 opened and the caps 22 and caps 23, with attendant parts, removed. The carbonized briquets, or charcoal blocks, may then be forced out of the retort-tubes through the openings 23. It may be stated that means are provided in practice for readily charging the tubes with the briquets and also for discharging them very quickly into a suitable chilling receptacle to avoid danger of further combustion of the charcoal blocks. As the retort-tubes and collecting-chamber are air-tight or substantially so, the retorting operation may be carried on under a partial vacuum, produced by any well known means. By reason of the fact that the material undergoing destructive distillation is very dense, possesses the property of high heat-conductivity and is operated upon while in the form of a column, of comparatively small cross-section, it is possible to maintain the heat action thereon under perfect control. It also permits the vapors and liquids to be taken off with rapidity and without having to pass at any time through a zone of temperature materially higher than that at which they were generated. Thus the vapors when condensed and other liquid products are uninjured and in a form capable of commanding the highest market price. Where wood is treated in mass by destructive distillation without being pressed into blocks, the heat penetration is necessarily slow and unequal, so that the resulting vapors are made complex by the wide range of heat existing in different zones in the apparatus. In the practice of our process, the vaporized or liquefied products at any period of the run are those which have been driven off from blocks of uniform size and density, every one of which has been heated substantially throughout to the then existing temperature of the interior of the retort and not materially beyond that point. This permits the products to be separately collected as they emerge from the retort, which has a great advantage.

In this process the blocks, particularly when originally of resinous wood, do not disintegrate and the residuum or resultant product is in the form of blocks of charcoal. The process may be carried on until substantially all the volatile and liquefiable constituents are extracted, resulting in carbon blocks of remarkable purity, or the process may be stopped more or less short of this point to leave a desired percentage of such products in the resultant charcoal. By easily-controlled manipulation the quality and density of the charcoal-blocks may be regulated as desired, and the fact that the charcoal-blocks are all of the same size, density and composition, renders them of the greatest commercial value. If desired, when the carbonization is completed to the desired extent, and the caps 22 are removed, steam or any suitable inert gas, cooled for the purpose may be passed through the tubes to avoid danger of spontaneous ignition of the blocks, if they are to be discharged through the openings 23 into an oxidizing atmosphere, such as the open air.

In the practice of our process for the production, among other values, of the heavier resinous and tarry materials, there is an advantage in chilling, to a slight extent at least, the various products immediately upon their escape from the retort tubes 13 into the collecting-chamber 11. By causing an immediate lowering of the temperature of the products below that at which they were evolved, it arrests any tendency of the products of higher value to decompose into products of lower value. To bring about this chilling effect we show the chamber 11 surrounded by a water-jacket 31.

In the practical operation of our invention we have found, for technical and commercial reasons, that it is highly desirable to provide the blocks, or briquets, of comparatively small dimensions and of comparatively great density. The greater the density of the briquets the greater their heat conductivity and the greater their tendency to remain intact while undergoing destructive distillation. Furthermore the smaller they are the more rapidly they may be carbonized throughout, thus effecting great saving of time and heat in the operation. We have produced our best results by forming the briquets under pressure exceeding three tons to the square inch, and of less than eight inches in cross-section.

In order to avoid the use of indefinite terms in claiming our invention we believe now that by stating that the blocks should be less than eight inches in cross-section, and formed under greater pressure than three tons to the square inch, we define more especially the physical nature of the blocks, without thereby intending to be unduly limited.

The foregoing description is intended to convey a clearer understanding of our improvements in what we now believe to be the best form of their embodiment, and no undue limitation should be understood therefrom.

What we claim as new and desire to secure by Letters Patent is—

1. The process of treating wood by destructive distillation to carbonize fibrous and liberate other constituents, which consists in compressing the wood into blocks less than eight inches in cross-section and subjecting the same in the form of a column, while surrounded by a tubular retort of but slightly greater cross-section than the column, to heat applied thereto throughout the length of the column.

2. The process of treating wood by destructive distillation to carbonize fibrous and liberate other constituents, which consists in compressing the wood into blocks less than eight inches in cross-section and subjecting the same in the form of a column under longitudinal confinement, while surrounded by a tubular retort of but slightly greater cross-section, to heat applied thereto throughout the length of the column.

3. The process of treating comminuted wood, which consists in pressing the wood, in dry condition, into blocks less than eight inches in cross-section and subjecting the same in the form of a column, while surrounded by a tubular retort of but slightly greater cross-section, to heat applied thereto throughout the length of the column.

4. The process of treating wood by destructive distillation to carbonize fibrous and liberate other constituents, which consists in compressing the wood into blocks less than eight inches in cross-section and subjecting the same in the form of a column, while surrounded by a tubular retort of but slightly greater cross-section than the column, to heat applied thereto, throughout the length of the column, and collecting, during this procedure, various constituents of the wood thus driven off.

5. The process of treating wood by destructive distillation to carbonize fibrous and liberate other constituents, which consists in compressing the wood into blocks less than eight inches in cross-section and subjecting the same in the form of a column, while surrounded by a tubular retort of but slightly greater cross-section than the column, to heat applied thereto throughout the length of the column, and controlling the heat during the entire application thereof.

6. The process of treating wood by destructive distillation to carbonize fibrous and liberate other constituents, which consists in compressing the wood by a pressure exceeding three tons to the square inch into blocks measuring less than eight inches in all dimensions, whereby blocks of such density are formed that they will resist material crumbling while being carbonized throughout and result in solid blocks of charcoal, and subjecting the blocks in the form of a column, while surrounded by a tubular retort of but slightly greater cross-section than the column, to heat applied thereto throughout the length of the column.

7. The process of treating wood which consists in subjecting it in comminuted condition to a process which extracts the turpentine therefrom, then drying the resultant spent wood, then compressing the wood by a pressure exceeding three tons to the square inch into blocks measuring less than eight inches in all dimensions, whereby blocks of such density are formed that they will resist material crumbling while being carbonized throughout and result in solid blocks of charcoal, and subjecting the blocks in the form of a column, while surrounded by a tubular retort of but slightly greater cross-section than the column, to heat applied thereto throughout the length of the column.

HARRISON M. ANGLE
FRANK J. ROOT.

In presence of—
R. A. RAYMOND,
O. C. AVISUS.